US008268920B2

(12) United States Patent
Prusty et al.

(10) Patent No.: US 8,268,920 B2
(45) Date of Patent: Sep. 18, 2012

(54) HEAT AGING RESISTANT POLYAMIDES

(75) Inventors: Manoranjan Prusty, Mannheim (DE); Philippe Desbois, Edingen-Neckarhausen (DE); Matthias Scheibitz, Weinheim (DE); Martin Baumert, Dossenheim (DE)

(73) Assignee: BASF SE (DE)

( * ) Notice: Subject to any disclaimer, the term of this patent is extended or adjusted under 35 U.S.C. 154(b) by 0 days.

(21) Appl. No.: 13/139,768

(22) PCT Filed: Dec. 10, 2009

(86) PCT No.: PCT/EP2009/066807
§ 371 (c)(1),
(2), (4) Date: Sep. 15, 2011

(87) PCT Pub. No.: WO2010/076145
PCT Pub. Date: Jul. 8, 2010

(65) Prior Publication Data
US 2012/0004353 A1 Jan. 5, 2012

(30) Foreign Application Priority Data
Dec. 16, 2008 (EP) .................... 08171803

(51) Int. Cl.
C08K 3/08 (2006.01)
(52) U.S. Cl. ....................................... 524/440
(58) Field of Classification Search .............. 524/440
See application file for complete search history.

(56) References Cited

U.S. PATENT DOCUMENTS

| | | |
|---|---|---|
| 2,071,250 A | 2/1937 | Carothers |
| 2,071,251 A | 2/1937 | Carothers |
| 2,130,523 A | 9/1938 | Carothers |
| 2,130,948 A | 9/1938 | Carothers |
| 2,241,322 A | 5/1941 | Hanford |
| 2,312,966 A | 3/1943 | Hanford |
| 2,512,606 A | 6/1950 | Bolton et al. |
| 3,393,210 A | 7/1968 | Speck |
| 4,144,123 A | 3/1979 | Scharf et al. |
| 4,148,846 A | 4/1979 | Owens et al. |
| 4,360,617 A | 11/1982 | Muller et al. |
| 4,371,674 A | 2/1983 | Hertel et al. |
| 4,396,742 A | 8/1983 | Binsack et al. |
| 4,537,949 A | 8/1985 | Schmidt et al. |
| 4,540,772 A | 9/1985 | Pipper et al. |
| 4,771,109 A | 9/1988 | Eichenauer et al. |
| 4,873,289 A | 10/1989 | Lindner et al. |
| 4,882,381 A | 11/1989 | Wittmann et al. |
| 5,010,135 A | 4/1991 | Eckel et al. |
| 5,536,370 A | 7/1996 | Scherr et al. |
| 5,641,855 A | 6/1997 | Scherr et al. |
| 6,063,286 A | 5/2000 | Steuerle et al. |
| 6,194,538 B1 | 2/2001 | Weiss et al. |
| 6,391,982 B1 | 5/2002 | Haeger et al. |
| 6,699,960 B1 | 3/2004 | Ohlbach et al. |
| 2003/0195296 A1 | 10/2003 | Dames et al. |
| 2006/0155034 A1 | 7/2006 | Gijsman et al. |
| 2006/0235191 A1 | 10/2006 | Deininger et al. |
| 2008/0146718 A1 | 6/2008 | Gijsman et al. |
| 2008/0262133 A1 | 10/2008 | Eibeck et al. |

FOREIGN PATENT DOCUMENTS

| | | |
|---|---|---|
| DE | 2702661 A1 | 8/1977 |
| DE | 3725576 A1 | 2/1989 |
| DE | 3800603 A1 | 7/1989 |
| DE | 19931720 A1 | 1/2001 |
| DE | 10030553 A1 | 1/2002 |
| DE | 10313681 A1 | 10/2004 |
| DE | 102005005847 A1 | 8/2006 |
| EP | 25515 A1 | 3/1981 |
| EP | 0038094 A2 | 10/1981 |
| EP | 0038582 A2 | 10/1981 |
| EP | 0039524 A1 | 11/1981 |
| EP | 0 050 265 A1 | 4/1982 |
| EP | 129195 A2 | 12/1984 |
| EP | 129196 A2 | 12/1984 |
| EP | 0 208 187 A2 | 1/1987 |
| EP | 235690 A2 | 9/1987 |
| EP | 299444 A2 | 1/1989 |
| EP | 0319290 A2 | 6/1989 |
| EP | 675914 A1 | 10/1995 |
| EP | 895521 A1 | 2/1999 |
| EP | 922065 A2 | 6/1999 |
| EP | 1065236 A2 | 1/2001 |
| EP | 1198491 A1 | 4/2002 |
| GB | 1290383 A | 9/1972 |
| WO | WO-94/12560 A1 | 6/1994 |
| WO | WO-94/14873 A1 | 7/1994 |
| WO | WO-97/40088 A1 | 10/1997 |
| WO | WO-98/08889 A2 | 3/1998 |
| WO | WO-01/09224 A1 | 2/2001 |
| WO | WO-2005/007727 A1 | 1/2005 |
| WO | WO-2006/074912 A1 | 7/2006 |
| WO | WO-2008/110327 A1 | 9/2008 |
| WO | WO-2011051121 A1 | 5/2011 |
| WO | WO-2011051123 A1 | 5/2011 |

OTHER PUBLICATIONS

"Anorganische Stabilisatoren," Kunstoff Handbuch, 1998, Carl Hanser Verlag Munchen Wien, 3/4, 2.7.5.3.1, p. 293. "Organische Stabilisatoren," Kunststoff Handbuch, 1998, Carl Hanser Verlag Munchen Wien, 3/4, 2.7.5.3.2, p. 293.
Sayed et al., "Stabilisierung," Kunststoff Handbuch, 1998, Carl Hanser Verlag Munchen Wien, 3/4, 2.3.1, pp. 75-76.
Rhode-Liebenau et al., "Stabilisierung," Kunstsoff Handbuch, 1998, Carl Hanser Verlag Munchen Wien, 3/4, 4.5.1, pp. 666-670.
"Thermische Eigenschaften," Kunststoff Handbuch, 1998, Carl Hanser Verlag Munchen Wien, 3/4, 4.7.3, pp. 689-690.
"Thermische Eigenschaften," Kunststoff Handbuch, 1998, Carl Hanser Verlag Munchen Wien, 3/4, 5.6.2, p. 785.
"Thermische Kurzzeiteigenschaften," Kunststoff Handbuch, 1998, Carl Hanser Verlag Munchen Wien, 3/4, 3.6.3, pp. 586-587.
"Thermische Zersetzung," Kunststoff Handbuch, 1998, Carl Hanser Verlag Munchen Wien, 3/4, 5.5.6, p. 783.
"Wärmestabilisierung," Kunststoff Handbuch, 1998, Carl Hanser Verlag Munchen Wien, 3/4, 2.10.3.2, p. 411.

Primary Examiner — Peter Szekely
(74) Attorney, Agent, or Firm — Connolly Bove Lodge & Hutz LLP

(57) ABSTRACT

Thermoplastic molding compositions comprising
A) from 10 to 99.94% by weight of a polyamide,
B) from 0.05 to 5% by weight of a polyethyleneimine homo- or copolymer,
C) from 0.01 to 20% by weight of iron powder, and
D) from 0 to 70% by weight of further additives,
where the total of the percentages by weight of A) to D) is 100%.

14 Claims, No Drawings

HEAT AGING RESISTANT POLYAMIDES

CROSS-REFERENCE TO RELATED APPLICATIONS

This application is a national stage application (under 35 U.S.C. §371) of PCT/EP2009/066807, filed Dec. 10, 2009, which claims benefit of European application 08178033, filed Dec. 16, 2008.

BACKGROUND OF THE INVENTION

The invention relates to thermoplastic molding compositions comprising
A) from 10 to 99.94% by weight of a polyimide,
B) from 0.05 to 5% by weight of a polyethyleneimine homo- or copolymer,
C) from 0.01 to 20% by weight of iron powder, and
D) from 0 to 70% by weight of further additives,
where the total of the percentages by weight of A) to D) is 100%.

The invention further relates to the use of the molding compositions of the invention for the production of fibers, or films, and of moldings of any type, and also to the moldings thus obtainable.

Thermoplastic polyamides, such as PA6 and PA66, are often used in the form of glassfiber-reinforced molding compositions as structural materials for components which during their lifetime have exposure to elevated temperatures, and this results in thermo-oxidative degradation phenomena. Addition of known heat stabilizers can delay the occurrence of the thermo-oxidative degradation but cannot prevent it in the long term, and an example of this is seen in a fall-off of mechanical properties. It is highly desirable to improve the resistance of polyamides to heat-aging (HAR), since this can give longer lifetimes for components subject to thermal stress or can reduce their risk of failure. As an alternative, improved HAR can also permit the use of the components at higher temperatures.

Kunststoff Handbuch [Plastics Handbook] 3. Technische Thermoplaste [Engineering thermoplastics], 4. Polyamide [Polyamides], 1998 Carl Hanser Verlag Munich, Vienna, edited by L. Bottenbruch, R. Binsack discloses the use of various heat stabilizers for polyamides. The use of hyperbranched polyethyleneimines in thermoplastic polymers is disclosed by way of example in DE 10030553 and DE 102005005847.

EP 1065236 discloses unreinforced polyamides in which polyethyleneimines and oligocarboxylic acids are used during the polymerization reaction. The molding compositions described have improved solvent resistance, but HAR is not fully satisfactory.

The use of elemental iron powder in polyamides is disclosed in WO 2006/074912 and WO 2005/007727.

Resistance to heat-aging remains inadequate in the known molding compositions, in particular over prolonged periods of thermal stress.

BRIEF SUMMARY OF THE INVENTION

The invention relates to a thermoplastic molding composition, comprising
A) from 10 to 99.94% by weight of a polyamide,
B) from 0.05 to 5% by weight of a polyethyleneimine homo- or copolymer with a ratio of primary, secondary, tertiary amino groups of 1/1.1/0.8 to 1/1.2/0.8,
C) from 0.01 to 20% by weight of iron powder, and
D) from 0 to 70% by weight of further additives,
where the total of the percentages by weight of A) to D) does not exceed 100%.

The present invention was therefore based on the object of providing thermoplastic polyamide molding compositions which have improved HAR and good flowability, and also good mechanical properties.

The molding compositions defined in the introduction have accordingly been found. Preferred embodiments are found in the subclaims.

DETAILED DESCRIPTION OF THE INVENTION

The molding compositions of the invention comprise, as component A), from 10 to 99.94% by weight, preferably from 20 to 95% by weight, and in particular from 20 to 80% by weight, of at least one polyamide.

The intrinsic viscosity of the polyamides of the molding compositions of the invention is generally from 90 to 350 ml/g, preferably from 110 to 240 ml/g, determined in a 0.5% strength by weight solution in 96% strength by weight sulfuric acid at 25° C. to ISO 307.

Preference is given to semicrystalline or amorphous resins with a molecular weight (weight average) of at least 5000, for example those described in the following U.S. Pat. Nos.: 2,071,250, 2,071,251, 2,130,523, 2,130,948, 2,241,322, 2,312,966, 2,512,606 and 3,393,210.

Examples of these are polyamides which derive from lactams having from 7 to 13 ring members, e.g. polycaprolactam, polycaprylolactam and polylaurolactam, and also polyamides obtained via reaction of dicarboxylic acids with diamines.

Dicarboxylic acids which may be used are alkanedicarboxylic acids having from 6 to 12, in particular from 6 to 10, carbon atoms, and aromatic dicarboxylic acids. Acids which may be mentioned here merely as examples are adipic acid, azelaic acid, sebacic acid, dodecanedioic acid and terephthalic and/or isophthalic acid.

Particularly suitable diamines are alkanediamines having from 6 to 12, in particular from 6 to 8, carbon atoms, and also m-xylylenediamine, di(4-aminophenyl)methane, di(4-aminocyclohexyl)methane, 2,2-di(4-aminophenyl)propane, 2,2-di(4-amino-cyclohexyl)propane or 1,5-diamino-2-methylpentane.

Preferred polyamides are polyhexamethyleneadipamide, polyhexamethylene-sebacamide and polycaprolactam, and also nylon-6/6,6 copolyamides, in particular having a proportion of from 5 to 95% by weight of caprolactam units.

Other suitable polyamides are obtainable from ω-aminoalkyl nitriles, e.g. amino-capronitrile (PA 6) and adipodinitrile with hexamethylenediamine (PA 66) via what is known as direct polymerization in the presence of water, for example as described in DE-A 10313681, EP-A 1198491 and EP 922065.

Mention may also be made of polyamides obtainable, by way of example, via condensation of 1,4-diaminobutane with adipic acid at an elevated temperature (nylon-4,6). Preparation processes for polyamides of this structure are described by way of example in EP-A 38 094, EP-A 38 582, and EP-A 39 524.

Other suitable materials are polyamides obtainable via copolymerization of two or more of the abovementioned monomers, and mixtures of two or more polyamides in any desired mixing ratio. Particular preference is given to mixtures of nylon-6,6 with other polyamides, and in particular to nylon-6/6,6 copolyamides.

Other polyamides which have proven particularly advantageous are semiaromatic copolyamides, such as PA 6/6T and PA 66/6T, where the triamine content of these is less than 0.5% by weight, preferably less than 0.3% by weight (see EP-A 299 444).

The processes described in EP-A 129 195 and 129 196 can be used to prepare the preferred semiaromatic copolyamides with low triamine content.

The following list, which is not comprehensive, comprises the polyamides A) mentioned and other polyamides A) for the purposes of the invention, and the monomers present:

AB Polymers:
PA 4 Pyrrolidone
PA 6 ε-Caprolactam
PA 7 Ethanolactam
PA 8 Caprylolactam
PA 9 9-Aminopelargonic acid
PA 11 11-Aminoundecanoic acid
PA 12 Laurolactam AA/BB Polymers:
PA 46 Tetramethylenediamine, adipic acid
PA 66 Hexamethylenediamine, adipic acid
PA 69 Hexamethylenediamine, azelaic acid
PA 610 Hexamethylenediamine, sebacic acid
PA 612 Hexamethylenediamine, decanedicarboxylic acid
PA 613 Hexamethylenediamine, undecanedicarboxylic acid
PA 1212 1,12-Dodecanediamine, decanedicarboxylic acid
PA 1313 1,13-Diaminotridecane, undecanedicarboxylic acid
PA 6T Hexamethylenediamine, terephthalic acid
PA MXD6 m-Xylylenediamine, adipic acid AA/BB Polymers:
PA 6I Hexamethylenediamine, isophthalic acid
PA 6-3-T Trimethylhexamethylenediamine, terephthalic acid
PA 6/6T (see PA 6 and PA 6T)
PA 6/66 (see PA 6 and PA 66)
PA 6/12 (see PA 6 and PA 12)
PA 66/6/610 (see PA 66, PA 6 and PA 610)
PA 6I/6T (see PA 6I and PA 6T)
PA PACM 12 Diaminodicyclohexylmethane, laurolactam
PA 6I/6T/PACM as PA 6I/6T+diaminodicyclohexylmethane
PA 12/MACMI Laurolactam, dimethyldiaminodicyclohexylmethane, isophthalic acid
PA 12/MACMT Laurolactam, dimethyldiaminodicyclohexylmethane, terephthalic acid
PA PDA-T Phenylenediamine, terephthalic acid According to the invention, the thermoplastic molding compositions comprise, as component B), from 0.05 to 5% by weight of at least one polyethyleneimine homopolymer or polyethyleneimine copolymer. The proportion of B) is preferably from 0.1 to 3% by weight and in particular from 0.1 to 1% by weight, based on A) to D).

For the purposes of the present invention, polyethyleneimines are either homo- or copolymers, obtainable by way of example by the process in Ullmann Electronic Release under the keyword "Aziridine" [Aziridines], or according to WO-A 94/12560.

The homopolymers are generally obtainable via polymerization of ethyleneimine (aziridine) in aqueous or organic solution in the presence of compounds which cleave to give acids, or of acids or of Lewis acids. These homopolymers are branched polymers which generally comprise primary, secondary, and tertiary amino groups in a ratio of about 30%:40%:30%. The distribution of the amino groups can generally be determined by $^{13}C$ NMR spectroscopy. This is preferably from 1/0.8/0.5 to 1/1.3/0.8, in particular from 1/1.1/0.8 to 1/1.2/0.8.

Comonomers used are preferably compounds which have at least two amino functions. By way of example of suitable comonomers, mention may be made of alkylenediamines having from 2 to 10 carbon atoms in the alkylene radical, preferably ethylenediamine and propylenediamine. Other suitable comonomers are diethylenetriamine, triethylenetetramine, tetraethylenepentamine, dipropylenetriamine, tripropylenetetramine, dihexamethylenetriamine, aminopropylethylenediamine, and bisaminopropylethylenediamine.

The average molecular weight (weight average) of polyethyleneimines is usually from 100 to 3 000 000, preferably from 800 to 2 000 000 (determined by light scattering). The preferred $M_w$ is from 900 to 50 000, in particular from 1100 to 25 000.

Other suitable compounds are crosslinked polyethyleneimines obtainable via reaction of polyethyleneimines with bi- or polyfunctional crosslinking agents which have, as functional group, at least one halohydrin unit, glycidyl unit, aziridine unit, isocyanate unit, or one halogen atom. Examples that may be mentioned are epichlorohydrin or bischlorohydrin ethers of polyalkylene glycols having from 2 to 100 ethylene oxide units and/or propylene oxide units, and also the compounds listed in DE-A 19 93 17 20 and U.S. Pat. No. 4,144,123. Processes for the production of crosslinked polyethyleneimines are known inter alia from the abovementioned specifications, and also EP-A 895 521 and EP-A 25 515.

Grafted polyethyleneimines are also suitable, and the grafting agents that can be used comprise any of the compounds which can react with the amino or imino groups of the polyethyleneimines. Suitable grafting agents and processes for the production of grafted polyethyleneimines are found by way of example in EP-A 675 914.

Polyethyleneimines likewise suitable for the purposes of the invention are amidated polymers, which are usually obtainable via reaction of polyethyleneimines with carboxylic acids, their esters or anhydrides, or carboxamides, or carbonyl halides. As a function of the proportion of the amidated nitrogen atoms in the polyethyleneimine chain, the amidated polymers can be subsequently crosslinked using the crosslinking agents mentioned. It is preferable that up to 30% of the amino functions are amidated here, in order that there are sufficient primary and/or secondary nitrogen atoms available for a subsequent crosslinking reaction.

Other suitable compounds are alkoxylated polyethyleneimines, which are by way of example obtainable via reaction of polyethyleneimine with ethylene oxide and/or with propylene oxide. These alkoxylated polymers can also be subsequently crosslinked.

Other suitable polyethyleneimines of the invention that may be mentioned are polyethyleneimines containing hydroxy groups and amphoteric polyethyleneimines (incorporation of anionic groups), and also lipophilic polyethyleneimines, which are generally obtained via incorporation of long-chain hydrocarbon radicals into the polymer chain. Processes for the production of these polyethyleneimines are known to the person skilled in the art, and further details in this connection would therefore be superfluous.

The molding compositions of the invention comprise, as component C), from 0.01 to 20% by weight, preferably from 0.05 to 10% by weight, and in particular from 0.1 to 5% by weight, of iron powder.

Iron occurs in a number of allotropes:
1. α-Fe (ferrite) forms space-centered cubic lattices, is magnetizable, dissolves a small amount of carbon, and occurs in pure iron up to 928° C. At 770° C. (Curie temperature) it loses its ferromagnetic properties and becomes paramagnetic; iron in the temperature range from 770 to 928° C. is also termed β-Fe. At normal temperature and at a pressure of at least 13 000 MPa, α-Fe becomes what is known as ε-Fe with a reduction of about 0.2 cm³/mol in volume, whereupon density increases from 7.85 to 9.1 (at 20 000 MPa).

2. γ-Fe (cf. austenite) forms face-centered cubic lattices, is nonmagnetic, dissolves a large amount of carbon, and is observable only in the temperature range from 928 to 1398° C.

3. γ-Fe, space-centered, exists at from 1398° C. to the melting point of 1539° C.

Metallic iron is generally silver-white, density 7.874 (heavy metal), melting point 1539° C., boiling point 2880° C.; specific heat (from 18 to 100° C.) about 0.5 g$^{-1}$ K, tensile strength from 220 to 280 N/mm². The values apply to chemically pure iron.

Iron is obtained via reduction of iron oxide by hydrogen at low temperature in the form of chemically pure powder, via thermal decomposition of pentacarbonyliron as in Fe (CO)$_5$→Fe+5CO at from 150 to 250° C. in the form of high-purity powder—carbonyl iron—or via electrolysis of ferrous chloride solution or ferrous sulfate solution using insoluble graphite or a soluble anode composed of sheet iron or cast iron. Deposition from ferrous sulfate solution acidified with sulfuric acid, at mercury cathodes, followed by refining, can give 99.99%-purity iron. Iron is produced industrially via smelting of iron ores, iron slag, burnt ores, or blast-furnace-flue dust, and via resmelting of scrap and alloys.

Preferred iron powder C) has an average particle size $d_{50}$ of at most 450 µm, in particular from 20 to 250 µm, very particularly preferably from 30 to 100 µm (according to ASTM D1921-89, method A).

These products are obtainable by way of example as SCM IronPowder A 131 from SCM Metal Products.

In order to obtain particularly good distribution of the iron particles, a masterbatch with a polymer may be used. Polymers such as polyolefins, polyesters, or polyamides are suitable for this purpose, and the masterbatch polymer here is preferably identical with component A). The proportion by weight of the iron in the polymer is generally from 15 to 40% by weight, preferably from 20 to 30% by weight.

Suitable masterbatch compositions are obtainable commercially, for example in the form of Shelfplus O2 2400 from Ciba Spezialitätenchemie GmbH (20% strength masterbatch with polyethylene, $d_{50}$=30 µm).

The molding compositions of the invention can comprise, as component D), up to 70% by weight, preferably up to 50% by weight, of further additives.

Fibrous or particulate fillers D1) that may be mentioned are carbon fibers, glass fibers, glass beads, amorphous silica, calcium silicate, calcium metasilicate, magnesium carbonate, kaolin, chalk, powdered quartz, mica, barium sulfate and feldspar, used in amounts of from 1 to 50% by weight, in particular from 1 to 40% by weight, preferably from 10 to 40% by weight.

Preferred fibrous fillers which may be mentioned are carbon fibers, aramid fibers and potassium titanate fibers, and particular preference is given to glass fibers in the form of E glass. These may be used as rovings or in the commercially available forms of chopped glass.

The fibrous fillers may have been surface-pretreated with a silane compound to improve compatibility with the thermoplastic.

Suitable silane compounds have the general formula:

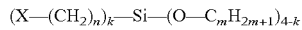

where:

X is NH$_2$—,

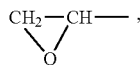

HO—, n is a whole number from 2 to 10, preferably 3 to 4,
m is a whole number from 1 to 5, preferably 1 to 2, and
k is a whole number from 1 to 3, preferably 1.

Preferred silane compounds are aminopropyltrimethoxysilane, aminobutyltrimethoxysilane, aminopropyltriethoxysilane and aminobutyltriethoxysilane, and also the corresponding silanes which comprise a glycidyl group as substituent X.

The amounts of the silane compounds generally used for surface-coating are from 0.01 to 2% by weight, preferably from 0.025 to 1.0% by weight and in particular from 0.05 to 0.5% by weight (based on E)).

Acicular mineral fillers are also suitable.

For the purposes of the invention, acicular mineral fillers are mineral fillers with strongly developed acicular character. An example is acicular wollastonite. The mineral preferably has an L/D (length to diameter) ratio of from 8:1 to 35:1, preferably from 8:1 to 11:1. The mineral filler may optionally have been pretreated with the abovementioned silane compounds, but the pretreatment is not essential.

Other fillers which may be mentioned are kaolin, calcined kaolin, wollastonite, talc and chalk, and also lamellar or acicular nanofillers, the amounts of these preferably being from 0.1 to 10%. Materials preferred for this purpose are boehmite, bentonite, montmorillonite, vermiculite, hectorite, and laponite. The lamellar nanofillers are organically modified by prior-art methods, to give them good compatibility with the organic binder. Addition of the lamellar or acicular nanofillers to the inventive nanocomposites gives a further increase in mechanical strength.

The inventive molding compositions can comprise, as component D2), from 0.05 to 3% by weight, preferably from 0.1 to 1.5% by weight, and in particular from 0.1 to 1% by weight, of a lubricant.

Preference is given to the Al, alkali metal, or alkaline earth metal salts, or esters or amides of fatty acids having from 10 to 44 carbon atoms, preferably having from 14 to 44 carbon atoms.

The metal ions are preferably alkaline earth metal and Al, particular preference being given to Ca or Mg.

Preferred metal salts are Ca stearate and Ca montanate, and also Al stearate.

It is also possible to use a mixture of various salts, in any desired mixing ratio.

The carboxylic acids can be monobasic or dibasic. Examples which may be mentioned are pelargonic acid, palmitic acid, lauric acid, margaric acid, dodecanedioic acid, behenic acid, and particularly preferably stearic acid, capric acid, and also montanic acid (a mixture of fatty acids having from 30 to 40 carbon atoms).

The aliphatic alcohols can be monohydric to tetrahydric. Examples of alcohols are n-butanol or n-octanol, stearyl alcohol, ethylene glycol, propylene glycol, neopentyl glycol, pentaerythritol, preference being given to glycerol and pentaerythritol.

The aliphatic amines can be mono- to tribasic. Examples of these are stearylamine, ethylenediamine, propylenediamine, hexamethylenediamine, di(6-aminohexyl)amine, particular preference being given to ethylenediamine and hexamethylenediamine. Preferred esters or amides are correspondingly glycerol distearate, glycerol tristearate, ethylenediamine distearate, glycerol monopalmitate, glycerol trilaurate, glycerol monobehenate, and pentaerythritol tetrastearate.

It is also possible to use a mixture of various esters or amides, or of esters with amides in combination, in any desired mixing ratio.

The molding compositions of the invention can comprise, as component D3), from 0.05 to 3% by weight, preferably from 0.1 to 1.5% by weight, and in particular from 0.1 to 1% by weight, of a Cu stabilizer, preferably of a Cu(I) halide, in particular in a mixture with an alkali metal halide, preferably KI, in particular in a ratio of 1:4, or of a sterically hindered phenol, or a mixture thereof.

Preferred salts of monovalent copper used are cuprous acetate, cuprous chloride, cuprous bromide, and cuprous iodide. The materials comprise these in amounts of from 5 to 500 ppm of copper, preferably from 10 to 250 ppm, based on polyamide.

The advantageous properties are in particular obtained if the copper is present with molecular distribution in the polyamide. This is achieved if the concentrate comprising polyamide, and comprising a salt of monovalent copper, and comprising an alkali metal halide in the form of a solid, homogeneous solution is added to the molding composition. By way of example, a typical concentrate is composed of from 79 to 95% by weight of polyamide and from 21 to 5% by weight of a mixture composed of copper iodide or copper bromide and potassium iodide. The copper concentration in the solid homogenous solution is preferably from 0.3 to 3% by weight, in particular from 0.5 to 2% by weight, based on the total weight of the solution, and the molar ratio of cuprous iodide to potassium iodide is from 1 to 11.5, preferably from 1 to 5.

Suitable polyamides for the concentrate are homopolyamides and copolyamides, in particular nylon-6 and nylon-6,6.

Suitable sterically hindered phenols D3) are in principle any of the compounds having a phenolic structure and having at least one bulky group on the phenolic ring.

By way of example, compounds of the formula can be used, in which:

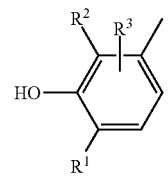

$R^1$ and $R^2$ are an alkyl group, a substituted alkyl group, or a substituted triazole group, where the radicals $R^1$ and $R^2$ can be identical or different, and $R^3$ is an alkyl group, a substituted alkyl group, an alkoxy group, or a substituted amino group.

Antioxidants of the type mentioned are described by way of example in DE-A 27 02 661 (U.S. Pat. No. 4,360,617).

Another group of preferred sterically hindered phenols is those derived from substituted benzenecarboxylic acids, in particular from substituted benzenepropionic acids.

Particularly preferred compounds from this class are compounds of the formula

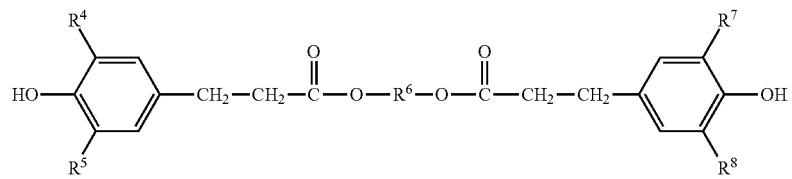

where $R^4$, $R^5$, $R^7$, and $R^8$, independently of one another, are $C_1$-$C_8$-alkyl groups which themselves may have substitution (at least one of these being a bulky group), and $R^6$ is a divalent aliphatic radical which has from 1 to 10 carbon atoms and whose main chain may also have C—O bonds.

Preferred compounds corresponding to these formulae are

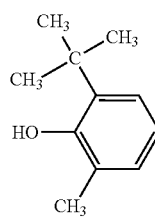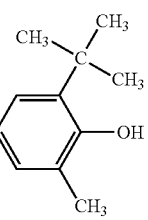

(Irganox® 245 from Ciba-Geigy)

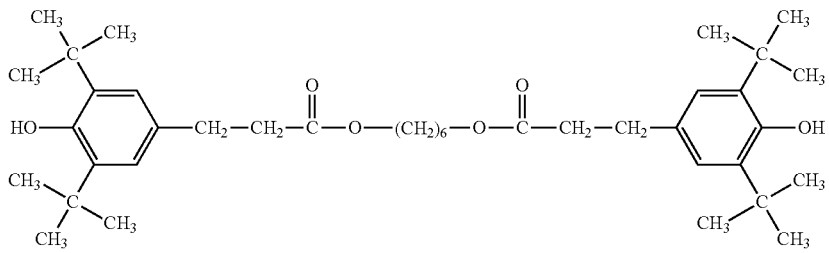

(Irganox® 259 from Ciba-Geigy)

All of the following should be mentioned as examples of sterically hindered phenols:

2,2'-methylenebis(4-methyl-6-tert-butylphenol), 1,6-hexanediol bis[3-(3,5-di-tert-butyl-4-hydroxyphenyl)propionate], pentaerythrityl tetrakis[3-(3,5-di-tert-butyl-4-hydroxy-phenyl)propionate], distearyl 3,5-di-tert-butyl-4-hydroxybenzylphosphonate, 2,6,7-trioxa-1-phosphabicyclo[2.2.2]oct-4-ylmethyl 3,5-di-tert-butyl-4-hydroxyhydrocinnamate, 3,5-di-tert-butyl-4-hydroxyphenyl-3,5-distearylthiotriazylamine, 2-(2'-hydroxy-3'-hydroxy-3',5'-di-tert-butylphenyl)-5-chlorobenzotriazole, 2,6-di-tert-butyl-4-hydroxymethylphenol, 1,3,5-trimethyl-2,4,6-tris(3,5-di-tert-butyl-4-hydroxy-benzyl)benzene, 4,4'-methylenebis(2,6-di-tert-butylphenol), 3,5-di-tert-butyl-4-hydroxy-benzyldimethylamine.

Compounds which have proven particularly effective and which are therefore used with preference are 2,2'-methylenebis(4-methyl-6-tert-butylphenol), 1,6-hexanediol bis(3,5-di-tent-butyl-4-hydroxyphenyl]propionate (Irganox® 259), pentaerythrityl tetrakis[3-(3,5-di-tert-butyl-4-hydroxyphenyl)propionate], and also N,N'-hexamethylene-bis-3,5-di-tert-butyl-4-hydroxyhydrocinnamide (Irganox® 1098), and the product Irganox® 245 described above from Ciba Geigy, which has particularly good suitability.

The amount comprised of the antioxidants D), which may be used individually or as a mixture, is from 0.05 up to 3% by weight, preferably from 0.1 up to 1.5% by weight, in particular from 0.1 to 1% by weight, based on the total weight of the molding compositions A) to D).

In some cases, sterically hindered phenols having no more than one sterically hindered group in ortho-position with respect to the phenolic hydroxyl group have proven particularly advantageous, in particular when assessing colorfastness on storage in diffuse light over relatively long periods.

The molding compositions of the invention can comprise, as component D4), from 0.05 to 5% by weight, preferably from 0.1 to 2% by weight, and in particular from 0.25 to 1% by weight, of a nigrosin.

Nigrosins are generally various embodiments (water-soluble, fat-soluble, petroleum-soluble) of a group of black or gray phenazine dyes (azine dyes) related to the indulins and used in wool dyeing, wool printing, black dyeing of silk, for the coloring of leather, of shoe polishes, of varnishes, of plastics, of stoving lacquers, of inks, and the like, and also as microscopy dyes.

Nigrosins are obtained industrially via heating of nitrobenzene, aniline, and aniline hydrochloride with metallic iron and $FeCl_3$ (name from the Latin niger=black).

Component D4) can be used in the form of free base or else in the form of salt (e.g. hydrochloride).

Further details relating to nigrosins are found way by way of example in the electronic Lexikon Römpp Online [Römpp's On-line Encyclopedia], Version 2.8, Thieme-Verlag Stuttgart, 2006, keyword "Nigrosin".

Examples of other conventional additives D) are amounts of up to 25% by weight, preferably up to 20% by weight, of elastomeric polymers (often also termed impact modifiers, elastomers, or rubbers).

These are very generally copolymers preferably comprised of at least two of the following monomers: ethylene, propylene, butadiene, isobutene, isoprene, chloroprene, vinyl acetate, styrene, acrylonitrile and acrylates and/or methacrylates having from 1 to 18 carbon atoms in the alcohol component.

Polymers of this type are described, for example, in Houben-Weyl, Methoden der organischen Chemie, Vol. 14/1 (Georg-Thieme-Verlag, Stuttgart, Germany, 1961), pages 392-406, and in the monograph by C. B. Bucknall, "Toughened Plastics" (Applied Science Publishers, London, UK, 1977).

Some preferred types of such elastomers are described below.

Preferred types of such elastomers are those known as ethylene-propylene (EPM) and ethylene-propylene-diene (EPDM) rubbers.

EPM rubbers generally have practically no residual double bonds, whereas EPDM rubbers may have from 1 to 20 double bonds per 100 carbon atoms.

Examples which may be mentioned of diene monomers for EPDM rubbers are conjugated dienes, such as isoprene and butadiene, non-conjugated dienes having from 5 to 25 carbon atoms, such as 1,4-pentadiene, 1,4-hexadiene, 1,5-hexadiene, 2,5-dimethyl-1,5-hexadiene and 1,4-octadiene, cyclic dienes, such as cyclopentadiene, cyclohexadienes, cyclooctadienes and dicyclopentadiene, and also alkenylnorbornenes, such as 5-ethylidene-2-norbornene, 5-butylidene-2-norbornene, 2-methallyl-5-norbornene and 2-isopropenyl-5-norbornene, and tricyclodienes, such as 3-methyltricyclo[$5.2.1.0^{2,6}$]-3,8-decadiene, and mixtures of these. Preference is given to 1,5-hexadiene, 5-ethylidenenorbornene and dicyclopentadiene. The diene content of the EPDM rubbers is preferably from 0.5 to 50% by weight, in particular from 1 to 8% by weight, based on the total weight of the rubber.

EPM and EPDM rubbers may preferably also have been grafted with reactive carboxylic acids or with derivatives of these. Examples of these are acrylic acid, methacrylic acid and derivatives thereof, e.g. glycidyl (meth)acrylate, and also maleic anhydride.

Copolymers of ethylene with acrylic acid and/or methacrylic acid and/or with the esters of these acids are another group of preferred rubbers. The rubbers may also comprise dicarboxylic acids, such as maleic acid and fumaric acid, or derivatives of these acids, e.g. esters and anhydrides, and/or monomers comprising epoxy groups. These monomers comprising dicarboxylic acid derivatives or comprising epoxy groups are preferably incorporated into the rubber by adding to the monomer mixture monomers comprising dicarboxylic acid groups and/or epoxy groups and having the general formulae I, II, III or IV

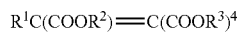  (I)

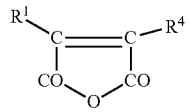  (II)

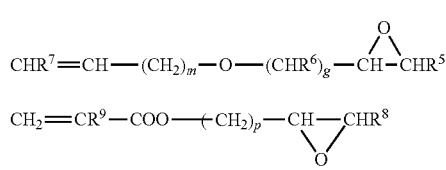  (III) (IV)

where $R^1$ to $R^9$ are hydrogen or alkyl groups having from 1 to 6 carbon atoms, and m is a whole number from 0 to 20, g is a whole number from 0 to 10 and p is a whole number from 0 to 5.

$R^1$ to $R^9$ are preferably hydrogen, where m is 0 or 1 and g is 1. The corresponding compounds are maleic acid, fumaric acid, maleic anhydride, allyl glycidyl ether and vinyl glycidyl ether.

Preferred compounds of the formulae I, II and IV are maleic acid, maleic anhydride and (meth)acrylates comprising epoxy groups, such as glycidyl acrylate and glycidyl methacrylate, and the esters with tertiary alcohols, such as tert-butyl acrylate. Although the latter have no free carboxy groups, their behavior approximates to that of the free acids and they are therefore termed monomers with latent carboxy groups.

The copolymers are advantageously composed of from 50 to 98% by weight of ethylene, from 0.1 to 20% by weight of monomers comprising epoxy groups and/or methacrylic acid and/or monomers comprising anhydride groups, the remaining amount being (meth)acrylates.

Particular preference is given to copolymers composed of from 50 to 98% by weight, in particular from 55 to 95% by weight, of ethylene, from 0.1 to 40% by weight, in particular from 0.3 to 20% by weight, of glycidyl acrylate and/or glycidyl methacrylate, (meth)acrylic acid and/or maleic anhydride, and from 1 to 45% by weight, in particular from 5 to 40% by weight, of n-butyl acrylate and/or 2-ethylhexyl acrylate.

Other preferred (meth)acrylates are the methyl, ethyl, propyl, isobutyl and tert-butyl esters.

Besides these, comonomers which may be used are vinyl esters and vinyl ethers.

The ethylene copolymers described above may be prepared by processes known per se, preferably by random copolymerization at high pressure and elevated temperature. Appropriate processes are well-known.

Other preferred elastomers are emulsion polymers whose preparation is described, for example, by Blackley in the monograph "Emulsion Polymerization". The emulsifiers and catalysts which can be used are known per se.

In principle it is possible to use homogeneously structured elastomers or else those with a shell structure. The shell-type structure is determined by the sequence of addition of the individual monomers. The morphology of the polymers is also affected by this sequence of addition.

Monomers which may be mentioned here, merely as examples, for the preparation of the rubber fraction of the elastomers are acrylates, such as n-butyl acrylate and 2-ethylhexyl acrylate, corresponding methacrylates, butadiene and isoprene, and also mixtures of these. These monomers may be copolymerized with other monomers, such as styrene, acrylonitrile, vinyl ethers and with other acrylates or methacrylates, such as methyl methacrylate, methyl acrylate, ethyl acrylate or propyl acrylate.

The soft or rubber phase (with a glass transition temperature of below 0° C.) of the elastomers may be the core, the outer envelope or an intermediate shell (in the case of elastomers whose structure has more than two shells). Elastomers having more than one shell may also have more than one shell composed of a rubber phase.

If one or more hard components (with glass transition temperatures above 20° C.) are involved, besides the rubber phase, in the structure of the elastomer, these are generally prepared by polymerizing, as principal monomers, styrene, acrylonitrile, methacrylonitrile, α-methylstyrene, p-methylstyrene, or acrylates or methacrylates, such as methyl acrylate, ethyl acrylate or methyl methacrylate. Besides these, it is also possible to use relatively small proportions of other comonomers.

It has proven advantageous in some cases to use emulsion polymers which have reactive groups at their surfaces. Examples of groups of this type are epoxy, carboxy, latent carboxy, amino and amide groups, and also functional groups which may be introduced by concomitant use of monomers of the general formula

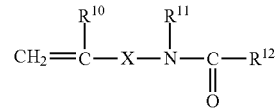

where the substituents can be defined as follows:
$R^{10}$ is hydrogen or a $C_1$-$C_4$-alkyl group,
$R^{11}$ is hydrogen, a $C_1$-$C_8$-alkyl group or an aryl group, in particular phenyl,
$R^{12}$ is hydrogen, a $C_1$-$C_{10}$-alkyl group, a $C_6$-$C_{12}$-aryl group, or —$OR^{13}$,
$R^{13}$ is a $C_1$-$C_8$-alkyl group or a $C_6$-$C_{12}$-aryl group, which can optionally have substitution by groups that comprise O or by groups that comprise N,
X is a chemical bond, a $C_1$-$C_{10}$-alkylene group, or a $C_6$-$C_{12}$-arylene group, or

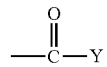

Y is O—Z or NH—Z, and
Z is a $C_1$-$C_{10}$-alkylene or $C_6$-$C_{12}$-arylene group.

The graft monomers described in EP-A 208 187 are also suitable for introducing reactive groups at the surface.

Other examples which may be mentioned are acrylamide, methacrylamide and substituted acrylates or methacrylates, such as (N-tert-butylamino)ethyl methacrylate, (N,N-dimethylamino)ethyl acrylate, (N,N-dimethylamino)methyl acrylate and (N,N-diethylamino)ethyl acrylate.

The particles of the rubber phase may also have been crosslinked. Examples of crosslinking monomers are 1,3- butadiene, divinylbenzene, diallyl phthalate and dihydrodicyclopentadienyl acrylate, and also the compounds described in EP-A 50 265.

It is also possible to use the monomers known as graft-linking monomers, i.e. monomers having two or more polymerizable double bonds which react at different rates during the polymerization. Preference is given to the use of compounds of this type in which at least one reactive group polymerizes at about the same rate as the other monomers, while the other reactive group (or reactive groups), for example, polymerize(s) significantly more slowly. The different polymerization rates give rise to a certain proportion of unsaturated double bonds in the rubber. If another phase is then grafted onto a rubber of this type, at least some of the double bonds present in the rubber react with the graft monomers to form chemical bonds, i.e. the phase grafted on has at least some degree of chemical bonding to the graft base.

Examples of graft-linking monomers of this type are monomers comprising allyl groups, in particular allyl esters of ethylenically unsaturated carboxylic acids, for example allyl acrylate, allyl methacrylate, diallyl maleate, diallyl fumarate and diallyl itaconate, and the corresponding monoallyl compounds of these dicarboxylic acids. Besides these there is a wide variety of other suitable graft-linking monomers. For further details reference may be made here, for example, to U.S. Pat. No. 4,148,846.

The proportion of these crosslinking monomers in the impact-modifying polymer is generally up to 5% by weight, preferably not more than 3% by weight, based on the impact-modifying polymer.

Some preferred emulsion polymers are listed below. Mention may first be made here of graft polymers with a core and with at least one outer shell, and having the following structure:

| Type | Monomers for the core | Monomers for the envelope |
|------|----------------------|---------------------------|
| I | 1,3-butadiene, isoprene, n-butyl acrylate, ethylhexyl acrylate, or a mixture of these | styrene, acrylonitrile, methyl methacrylate |
| II | as I, but with concomitant use of crosslinking agents | as I |
| III | as I or II | n-butyl acrylate, ethyl acrylate, methyl acrylate, 1,3-butadiene, isoprene, ethylhexyl acrylate |
| IV | as I or II | as I or III, but with concomitant use of monomers having reactive groups, as described herein |
| V | styrene, acrylonitrile, methyl methacrylate, or a mixture of these | first envelope composed of monomers as described under I and II for the core, second envelope as described under I or IV for the envelope |

Instead of graft polymers whose structure has more than one shell, it is also possible to use homogeneous, i.e. single-shell, elastomers composed of 1,3-butadiene, isoprene and n-butyl acrylate or of copolymers of these. These products, too, may be prepared by concomitant use of crosslinking monomers or of monomers having reactive groups.

Examples of preferred emulsion polymers are n-butyl acrylate-(meth)acrylic acid copolymers, n-butyl acrylate-glycidyl acrylate or n-butyl acrylate-glycidyl methacrylate copolymers, graft polymers with an inner core composed of n-butyl acrylate or based on butadiene and with an outer envelope composed of the abovementioned copolymers, and copolymers of ethylene with comonomers which supply reactive groups.

The elastomers described can also be produced by other conventional processes, e.g. via suspension polymerization.

Silicone rubbers, as described in DE-A 37 25 576, EP-A 235 690, DE-A 38 00 603 and EP-A 319 290, are likewise preferred.

It is, of course, also possible to use a mixture of the types of rubber listed above.

The thermoplastic molding compositions of the invention can comprise, as component D), conventional processing aids, such as stabilizers, oxidation retarders, agents to counteract decomposition by heat and decomposition by ultraviolet light, lubricants and mold-release agents, colorants, such as dyes and pigments, nucleating agents, plasticizers, flame retardants, etc.

Examples that may be mentioned of oxidation retarders and heat stabilizers are sterically hindered phenols and/or phosphites and amines (e.g. TAD), hydroquinones, aromatic secondary amines, such as diphenylamines, various substituted representatives of these groups, and mixtures of these, in concentrations up to 1% by weight, based on the weight of the thermoplastic molding compositions.

UV stabilizers that may be mentioned, these generally being used in amounts of up to 2% by weight, based on the molding composition, are various substituted resorcinols, salicylates, benzotriazoles, and benzophenones.

Colorants that may be added are inorganic pigments, such as titanium dioxide, ultramarine blue, iron oxide and carbon black, and also organic pigments, such as phthalocyanines, quinacridones, perylenes, and also dyes, such as anthraquinones.

Nucleating agents that can be used are sodium phenylphosphinate, aluminum oxide, silicon dioxide, and also preferably talc.

The thermoplastic molding compositions of the invention can be produced by processes known per se, by mixing the starting components in conventional mixing apparatuses, such as screw-based extruders, Brabender mixers, or Banbury mixers, and then extruding them. The extrudate can be cooled and comminuted. It is also possible to premix individual components and then to add the remaining starting materials individually and/or likewise in mixed form. The mixing temperatures are generally from 230 to 320° C.

In another preferred mode of operation, components B) to C), and also optionally D), can be mixed, compounded, and pelletized with a prepolymer. The resultant pellets are then condensed continuously or batchwise under an inert gas at a temperature below the melting point of component A) until the desired viscosity has been reached.

The thermoplastic molding compositions of the invention feature good processability together with good mechanical properties, and also markedly improved weld line strength and thermal stability.

These materials are suitable for the production of fibers, of films, and of moldings of any type. Some examples are mentioned below: cylinder head covers, motorcycle covers, intake pipes, charge-air cooler caps, plug connectors, gearwheels, fan wheels, cooling-water tanks.

Improved-flow polyamides can be used in the electrical and electronics sector for plugs, plug parts, plug connectors, cable-harness components, circuit mounts, circuit-mount components, three-dimensionally injection-molded circuit mounts, electrical connectors, and mechatronic components.

Possible uses in automobile interiors are for dashboards, steering-column switches, seat components, headrests, center consoles, gearbox components, and door modules, and possible uses in automobile exteriors are for door handles, exterior-mirror components, windshield-wiper components, windshield-wiper protective housings, grilles, roof rails, sunroof frames, engine covers, cylinder-head covers, intake pipes (in particular intake manifolds), windshield wipers, and also external bodywork components.

Possible uses of improved-flow polyamides in the kitchen and household sector are for the production of components for kitchen devices, e.g. fryers, smoothing irons, knobs, and also applications in the garden and leisure sector, e.g. components for irrigation systems, or garden devices, and door handles.

EXAMPLES

The following components were used:

Component A/1

Nylon-6 (polycaprolactam) with intrinsic viscosity IV of 148 ml/g, measured in the form of 0.5% strength by weight solution in 96% strength by weight sulfuric acid at 25° C. to ISO 307. (Ultramid® A27 from BASF SE was used.)

Component A/2

PA 6/66 (80:20) with IV of 176 ml/g (Ultramid® C31-01)

Component B) Polyethyleneimine

| Lupasol ® | G20 |
|---|---|
| $M_w$ | 1 300 |
| Primary/sec./tert. amines | 1/0.91/0.64 |

Lupasol ® = registered trademark of BASF SE
The ratio of primary/secondary/tertiary amines was determined by $^{13}$C NMR spectroscopy.

Component C)

Shelfplus 02 2400 from Ciba Spezialitätenchemie GmbH (20% strength Fe powder masterbatch in polyethylene, $d_{50}$=30 μm).

Component D/1

Glass fibers

Component D/2

Calcium montanate

Component D/3

CuI/Ki in a ratio of 1:4 (20% strength masterbatch in PA 6)

Component D/4

40% strength PA6 masterbatch with nigrosin

Component D/5

Ethylene-propylene copolymer, 0.75% by weight MA-grafted (MFR: (2.16 kg/230° C.) 3 g/10 min ASTM D1238

The molding compositions were produced in a ZSK 30 at throughput of 10 kg/h and with a flat temperature profile at about 260° C.

The following tests were carried out:

ISO 527 tensile test, mechanical properties prior to and after heat-aging at from 160 to 210° C. in a convection oven IV: c=5 gl/l in 96% strength sulfuric acid to ISO 307

MVR: 275° C., 5 kg, 4 min to ISO 1133

Flow spiral: 280° C./70° C., 1000 bar, 2 mm.

Impact resistance $a_k$ (without notch) was determined at 23° C. to ISO 179-2/1eU.

The constitutions of the molding compositions and the results of the tests are found in tables 1 to 4.

TABLE 1

| Ex. | A/1 [wt. %] | A/2 | B | C | D/1 | D/2 | D/3 | D/4 | D/5 | IV [ml/g] | MVR [ml/10] |
|---|---|---|---|---|---|---|---|---|---|---|---|
| 1 | 43.9 | 20.0 | 0.5 | 2.0 | 30 | 0.2 | 1.5 | 1.9 | — | 123 | 52.8 |
| 2 | 40.9 | 20.0 | 0.5 | 5.0 | 30 | 0.2 | 1.5 | 1.9 | — | 136 | 53.9 |
| 3 | 39.2 | 20.0 | 0.5 | 5.0 | 30 | 0.2 | 1.5 | 1.9 | 1.7 | 129 | 51.9 |
| 1 comp | 46.4 | 20.0 | — | — | 30 | 0.2 | 1.5 | 1.9 | — | 194 | 13.3 |
| 2 comp | 41.4 | 20.0 | — | 5.0 | 30 | 0.2 | 1.5 | 1.9 | — | 164 | 18.6 |
| 3 comp | 39.7 | 20.0 | — | 5.0 | 30 | 0.2 | 1.5 | 1.9 | 1.7 | 155 | 19.7 |
| 4 comp | 45.9 | 20.0 | 0.5 | — | 30 | 0.2 | 1.5 | 1.9 | — | 149 | 40.9 |

TABLE 2

Mechanical properties after heat-aging at 160° C.

| | $a_k$ [kJ/m$^2$] | |
|---|---|---|
| Example | 0 h | 1000 h |
| 1 | 80 | 51 |
| 2 | 75 | 45.7 |
| 3 | 89 | 55.7 |
| 1. comp | 92 | 33.4 |
| 2 comp | 92 | 39.4 |
| 3 comp | 92 | 46.6 |
| 4 comp | 77 | 48 |

TABLE 3

Mechanical properties after heat-aging at 200° C.

| | Modulus of elasticity [MPa] | | | | Yield stress [MPa] | | | | Tensile strain at break [%] | | | | $a_k$ [kJ/m$^2$] | | | |
|---|---|---|---|---|---|---|---|---|---|---|---|---|---|---|---|---|
| Ex. | 0 h | 250 h | 500 h | 1000 h | 0 h | 250 h | 500 h | 1000 h | 0 h | 250 h | 500 h | 1000 h | 0 h | 250 h | 500 h | 1000 h |
| 1 | 10148 | 10614 | 10881 | 10832 | 190 | 200 | 199 | 187 | 3.1 | 2.8 | 2.9 | 2.8 | 80 | — | 43.1 | 37.4 |
| 2 | 10051 | 10581 | 10602 | 10808 | 184 | 198 | 192 | 187 | 3.0 | 3.0 | 2.8 | 2.6 | 75 | — | 46.6 | 40.3 |
| 3 | 9552 | 10160 | 10005 | 10408 | 172 | 189 | 183 | 182 | 3.2 | 3.4 | 3.0 | 3.0 | 89 | — | 64.2 | 46.0 |
| 1 comp | 9913 | 10669 | 10775 | 10784 | 170 | 166 | 154 | 151 | 3.5 | 2.1 | 1.8 | 1.8 | 92 | — | 26.6 | 27.1 |
| 2 comp | 10028 | 10599 | 10782 | 10826 | 177 | 195 | 188 | 179 | 3.2 | 3.1 | 2.8 | 2.6 | 92 | — | 49.9 | 32.2 |
| 3 comp | 9704 | 10379 | 10300 | 10506 | 169 | 185 | 181 | 179 | 3.2 | 3.3 | 3.2 | 3.0 | 92 | — | 70.8 | 39.8 |
| 4 comp | 9922 | 10613 | 10279 | 10700 | 188 | 183 | 177 | 178 | 3.2 | 2.4 | 2.2 | 2.3 | 77 | — | 37.7 | 37.3 |

TABLE 4

| | Mechanical properties after heat-aging at 210° C. | | | | | | | | | | | |
|---|---|---|---|---|---|---|---|---|---|---|---|---|
| | Modulus of elasticity [MPa] | | | | Yield stress [MPa] | | | | Tensile strain at break [%] | | | |
| Ex. | 0 h | 250 h | 500 h | 1000 h | 0 h | 250 h | 500 h | 1000 h | 0 h | 250 h | 500 h | 1000 h |
| 1 | 10148 | 10699 | 10905 | 10921 | 190 | 200 | 190 | 180 | 3.1 | 2.8 | 2.5 | 2.9 |
| 2 | 10051 | 10651 | 10592 | 11066 | 184 | 192 | 178 | 157 | 3.0 | 2.8 | 2.4 | 1.9 |
| 3 | 9552 | 10428 | 10425 | 10494 | 172 | 187 | 176 | 164 | 3.2 | 3.2 | 2.6 | 2.2 |
| 1 comp | 9913 | 10787 | 10823 | 10667 | 179 | 165 | 166 | 134 | 3.5 | 2.0 | 2.1 | 1.5 |
| 2 comp | 10028 | 10868 | 10648 | 10871 | 177 | 191 | 176 | 144 | 3.2 | 3.0 | 2.4 | 1.6 |
| 3 comp | 9704 | 10521 | 10121 | 10709 | 169 | 183 | 172 | 152 | 3.2 | 3.2 | 2.6 | 1.9 |
| 4 comp | 9922 | 10549 | 10705 | 10709 | 188 | 188 | 191 | 166 | 3.2 | 2.5 | 2.6 | 2.0 |

The invention claimed is:

1. A thermoplastic molding composition, comprising
   E) from 10 to 99.94% by weight of a polyamide,
   F) from 0.05 to 5% by weight of a polyethyleneimine homo- or copolymer with a ratio of primary, secondary, tertiary amino groups of 1/1.1/0.8 to 1/1.2/0.8,
   G) from 0.01 to 20% by weight of iron powder, and
   H) from 0 to 70% by weight of further additives,
where the total of the percentages by weight of A) to D) does not exceed 100%.

2. The thermoplastic molding composition according to claim 1, comprising, as component D1), from 1 to 45% by weight of a fibrous or particulate additive.

3. The thermoplastic molding composition according to claim 1, comprising, as component D2), from 0.05 to 3% by weight of a lubricant.

4. The thermoplastic molding composition according to claim 2, comprising, as component D2), from 0.05 to 3% by weight of a lubricant.

5. The thermoplastic molding composition according to claim 1, comprising, as component D3), from 0.05 to 3% by weight of a copper-containing stabilizer or of a sterically hindered phenol, or a mixture of these.

6. The thermoplastic molding composition according to claim 4, comprising, as component D3), from 0.05 to 3% by weight of a copper-containing stabilizer or of a sterically hindered phenol, or a mixture of these.

7. The thermoplastic molding composition according to claim 1, comprising, as component D4), from 0.05 to 10% by weight of a nigrosin.

8. The thermoplastic molding composition according to claim 6, comprising, as component D4), from 0.05 to 10% by weight of a nigrosin.

9. The thermoplastic molding composition according to claim 1, in which component A) is composed of a nylon-6,6 or a mixture composed of nylon-6,6 with another polyamide.

10. The thermoplastic molding composition according to claim 8, in which component A) is composed of a nylon-6,6 or a mixture composed of nylon-6,6 with another polyamide.

11. The thermoplastic molding composition according to claim 1, where the average particle size $d_{50}$ of component C) is at most 450 μm (according to ASTM D 1921-89, method A).

12. The thermoplastic molding composition according to claim 10, where the average particle size $d_{50}$ of component C) is at most 450 μm (according to ASTM D 1921-89, method A).

13. A process for the production of a fiber, a foil, or a molding which comprises utilizing thermoplastic molding compositions according to claim 1.

14. A fiber, a foil, or a molding of any type obtainable from the thermoplastic molding compositions according to claim 1.

* * * * *